Feb. 20, 1934.   S. WILEY   1,947,507
SHOCK ABSORBER FOR PARACHUTES
Filed June 13, 1932
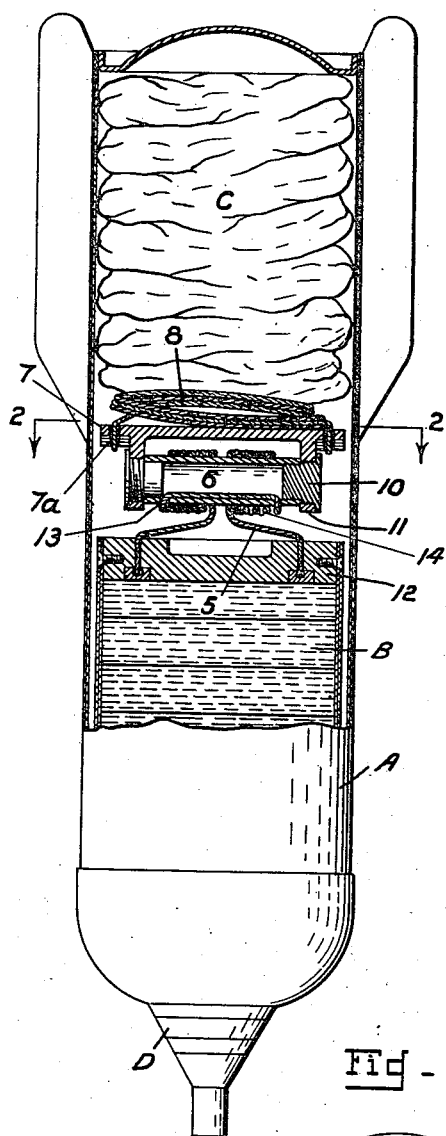
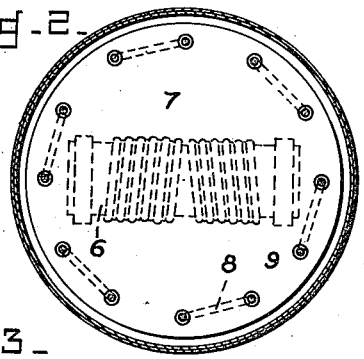
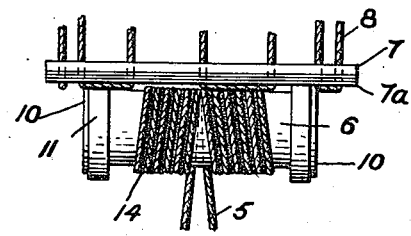
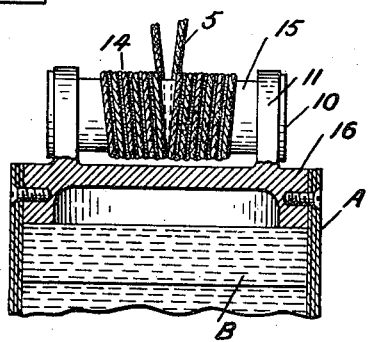
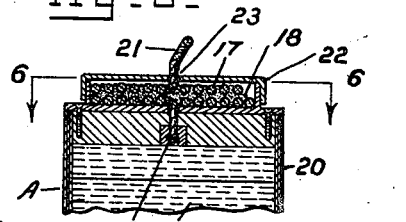
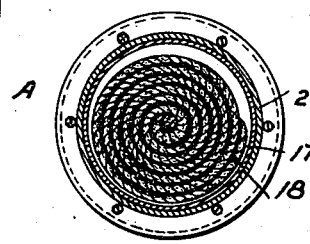
Inventor
Samuel Wiley
W. M. Roach
Attorney Patented Feb. 20, 1934

1,947,507

UNITED STATES PATENT OFFICE 1,947,507

SHOCK ABSORBER FOR PARACHUTES

Samuel Wiley, Metuchen, N. J.

Application June 13, 1932. Serial No. 616,941

3 Claims. (Cl. 244—21)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a shock absorber for parachutes.

When a parachute and a body to be supported thereby fall through a great distance before the parachute is released and opened, the shock occasioned by the sudden retardation is frequently sufficient to cause the shrouds of the fabric of the parachute to give way.

The purpose of the present invention is to associate a sock absorbing device with the parachute so that a gradual retardation may be obtained when the parachute is distended. More particularly the invention resides in a novel means for resisting the free unwinding of a cable from a spool.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a longitudinal sectional view partly in elevation of a flare including the improved shock absorbing device.

Fig. 2 is a sectional view on the line 2—2 of Fig. 1.

Fig. 3 is a detail view in side elevation of the spool.

Fig. 4 is a modification showing the spool carried by the suspended object.

Fig. 5 s a transverse sectional view of a further modification of the invention.

Fig. 6 is a sectional view on the line 6—6 of Fig. 5.

Referring to Figs. 1 to 3 there is shown a flare consisting of a container A in which is housed an illuminant B and a folded parachute C adapted to support the illuminant. A fuse, generally indicated at D, is included and operates in the usual manner to expel the illuminant and parachute from the container at a predetermined time after the flare has been launched from aircraft.

The connection between the illuminant and the parachute is effected by means of one or more cables 5 wound on a spool 6 that is carried by a disk 7 attached to the shrouds 8 of the parachute. The shrouds are preferably attached to the margin of the disk by being threaded through equally spaced apertures 9, (Fig. 2) and are safeguarded against being cut by means of a resilient pad 7a. The spool is rotatably supported on the inner ends of a pair of pins 10—10 threadedly secured in spaced arms 11—11 on the disk.

As illustrated two cable connections or suspensions are employed, each being secured to a block 12 carried by the illuminant and wound on the spool from the end inwardly towards the center thereof in order to suspend the illuminant in equilibrium. The end coils of the two cables are fastened to the spool and this is conveniently accomplished by providing an aperture 13 near each end of the spool through which the cables are inserted and secured or united. As many layers of cable may be employed as found convenient or necessary.

The coils of the cables are releasably connected to each other or to the spool by means of solder or by means of a plastic or adhesive material generally indicated at 14. This requirement is satisfied by any substance that will offer a desirable resistance to a force tending to uncoil the cables.

In operation when the illuminant and parachute have been expelled from the falling container, the parachute becomes distended and opened with a consequent retardation of its velocity. The energy of the appreciably heavy illuminant is gradually absorbed by the yielding unwinding of the cables 5 under resistance of the solder which must be torn or broken away. This action reduces the velocity of the unit in falling and consequently it reduces the shock on the parachute in opening The number of coils or layers of coils and the tenacity of the solder are selected according to the weight of the illuminant and the size of the parachute. The amount of cable that is unwound from the spool depends on the energy of the illuminant.

In the modification shown in Fig. 4 the spool 15 is carried by the block 16 of the illuminant.

In Fig. 6 a different method of applying the same principle is illustrated. In this instance the spool is eliminated and a single cable 17 is coiled flat in one or more layers, the coils and the layers of coils being releasably connected by solder 18 in the manner previously described. One end 19 of the cable is attached to the illuminant 20 and the other end 21 is attached to a parachute (not shown). The coils are housed in a casing 22 secured to the illuminant and in unwinding pass through an aperture 23 in the top of the casing whereby detachment in more than one coil is prevented.

I claim:

1. In combination a parachute and a body to be suspended thereby, a connection between the members comprising a spool carried by one of the members, a cable attached to the other member and to the spool, the cable being coiled on the spool, and solder between the coils.

2. In combination with a parachute and a body to be suspended thereby, a coiled connecting means between said members, and means cementing the coils of the connecting means and yieldingly resisting uncoiling thereof.

3. In combination with a parachute and a body to be suspended thereby, a cable connecting said members, a casing on one of the members, a flat coil of the cable disposed in the casing, and means in which the coils of the cable are embedded for yieldingly resisting uncoiling thereof.

SAMUEL WILEY.